United States Patent [19]

D'Alessio

[11] 4,430,019

[45] Feb. 7, 1984

[54] CONNECTOR ASSEMBLY

[75] Inventor: Michael S. D'Alessio, Flushing, N.Y.

[73] Assignee: Harsco Corporation, Camp Hill, Pa.

[21] Appl. No.: 231,493

[22] Filed: Feb. 4, 1981

[51] Int. Cl.³ .......................... B25G 3/00; F16B 2/14; F16B 21/80; F16G 11/00

[52] U.S. Cl. .................................... 403/409; 403/49; 182/178

[58] Field of Search ............................ 403/49, 405, 21; 182/178, 179; 52/637, 638, 639, 710, 40, 239, 721; 248/188.4, 188.2; 249/219 W

[56] References Cited

U.S. PATENT DOCUMENTS

| | | | |
|---|---|---|---|
| 2,904,870 | 9/1959 | Hillberg | 249/219 W |
| 3,095,672 | 7/1963 | DiTullio et al. | 52/710 |
| 3,307,871 | 3/1967 | Russell et al. | 294/97 X |
| 3,589,525 | 6/1971 | Allen | 52/710 |
| 3,813,179 | 5/1974 | Priest | 52/710 |
| 4,004,393 | 1/1977 | Morris | 403/49 |
| 4,188,143 | 2/1980 | Matsuura | 403/49 |
| 4,194,338 | 3/1980 | Tratton | 256/65 |

FOREIGN PATENT DOCUMENTS 629115  9/1949  United Kingdom ................ 182/178

*Primary Examiner*—Wayne L. Shedd

*Attorney, Agent, or Firm*—Curtis, Morris & Safford

[57] ABSTRACT

A wedge-and-bolt connector assembly for adjustably fixing a stud to a slotted thin-walled structure or the like, and especially for use in a scaffolding or shoring system to connect braces to vertical support elements or stanchions when the latter have outwardly opening T-slotted channels formed therein, which assembly includes a stud (advantageously having a T-shaped head adapted to be received in the channel) and a shank extending through the channel slot away from the head. The shank has a bearing surface thereon facing the stud head; and a tapered wedge is slidably mounted on the shank for engaging the bearing surface, thereby to urge the bolt head against the shoulders of the channel and firmly secure the stud to the support element. The wedge preferably has a longitudinal slot through which said T-bolt is loosely mounted. The free end of the stud may include an extension having a toggle thereon or other illustrated modifications for securing the brace to the stud shank. For safety, the shank of the T-bolt advantageously has at least a flattened portion (e.g. a squared portion) to engage the sides of the wedge-slot or the channel slot for positive orientation; the wedge having a nub on its underside to fit in the channel slot to orient the wedge parallel to the channel slot.

45 Claims, 14 Drawing Figures

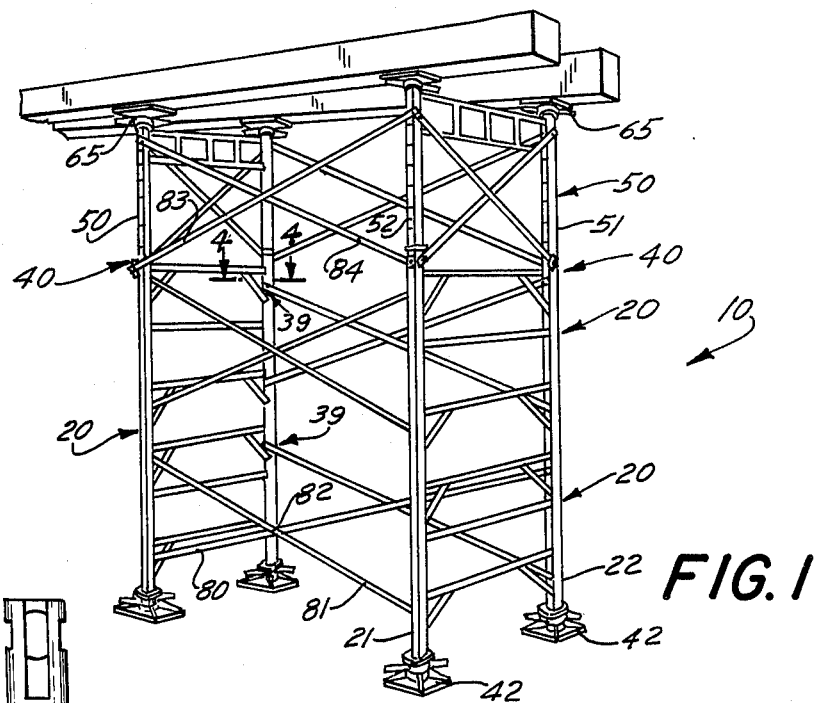
FIG.1
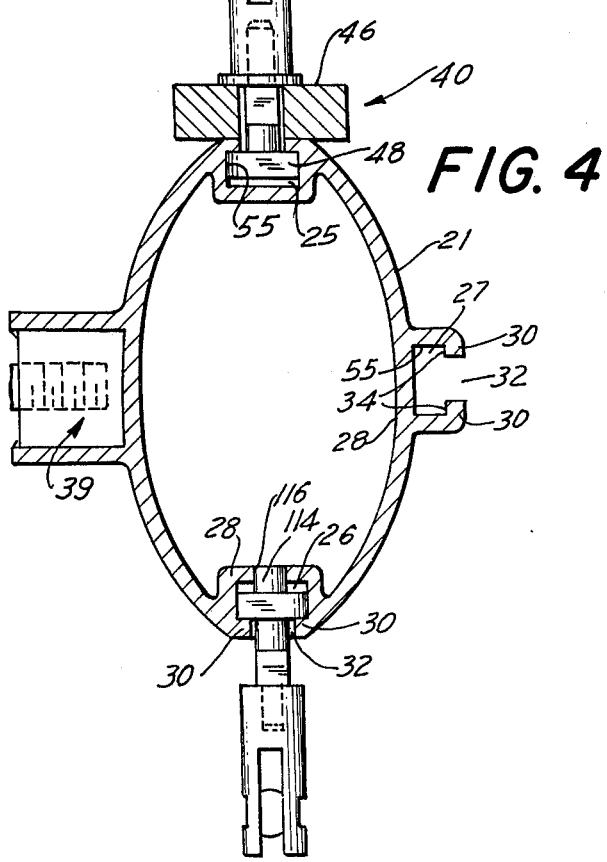
FIG.4
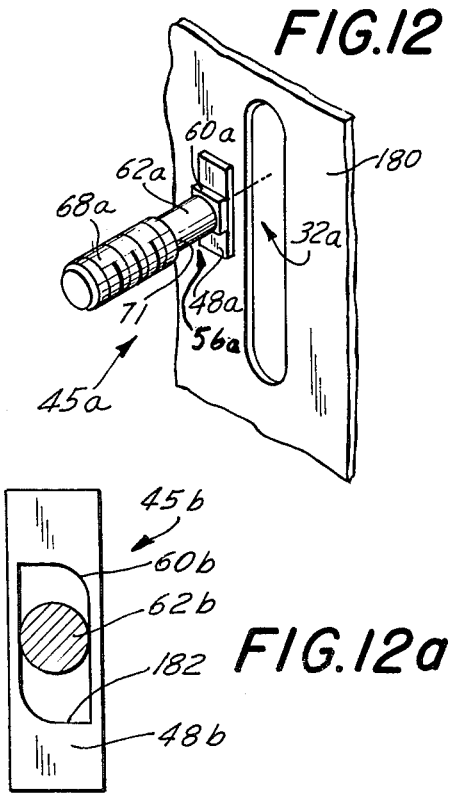
FIG.12
FIG.12a

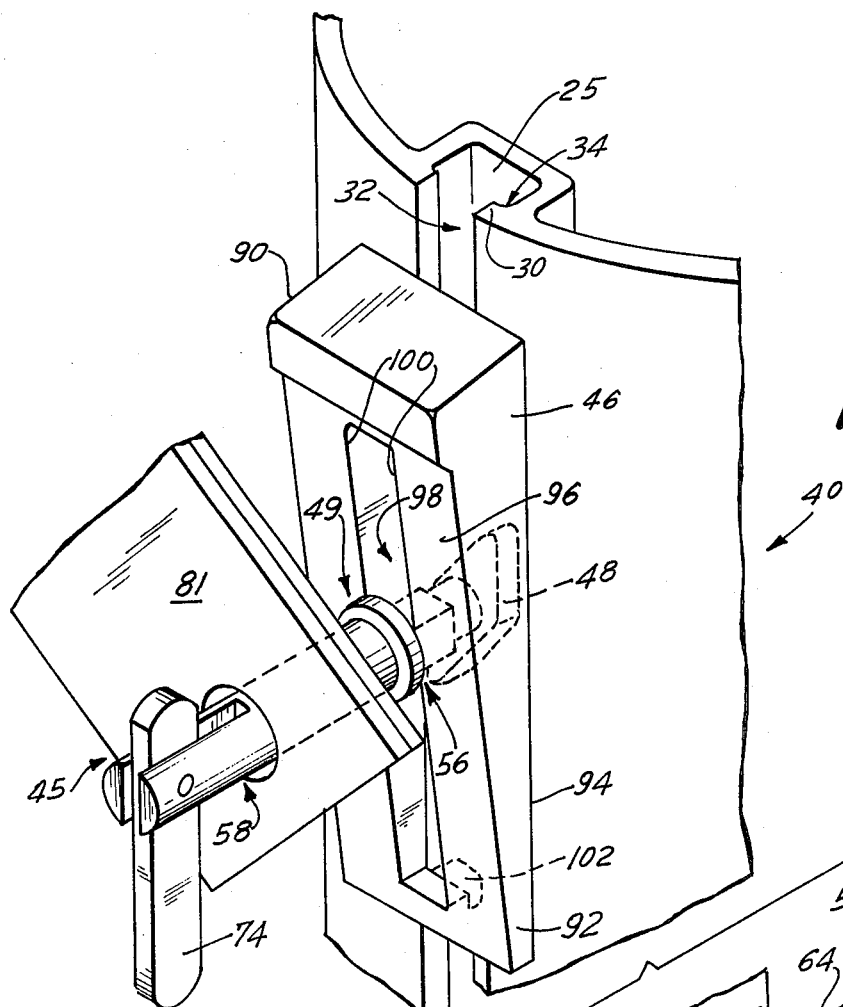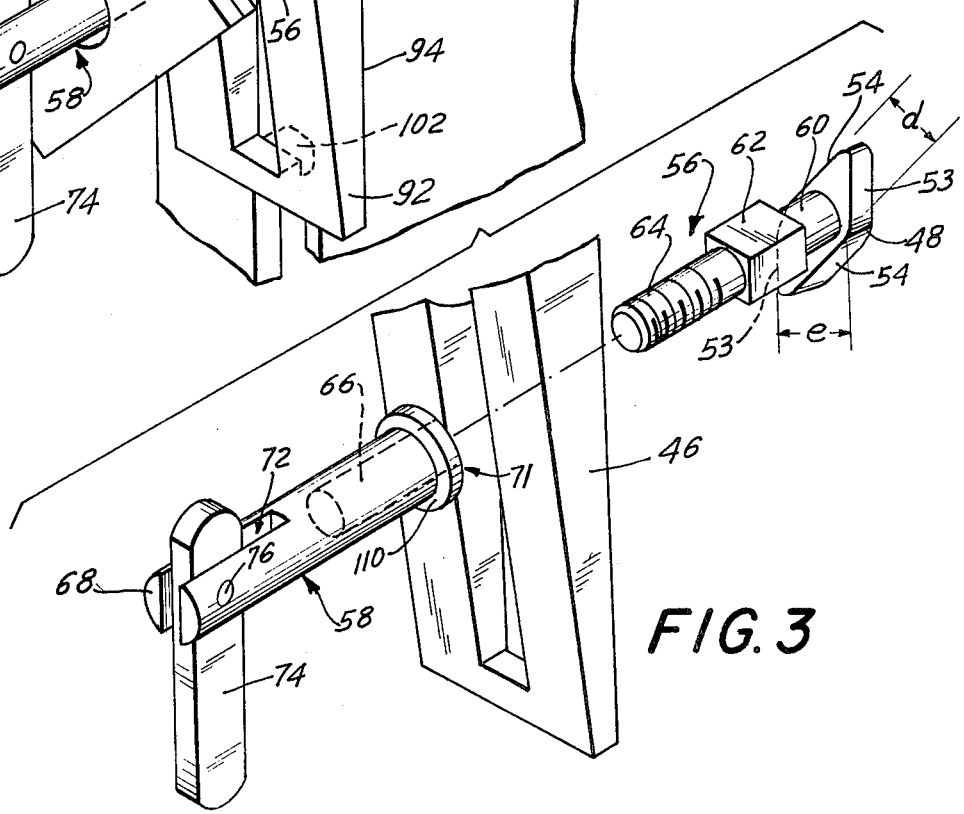

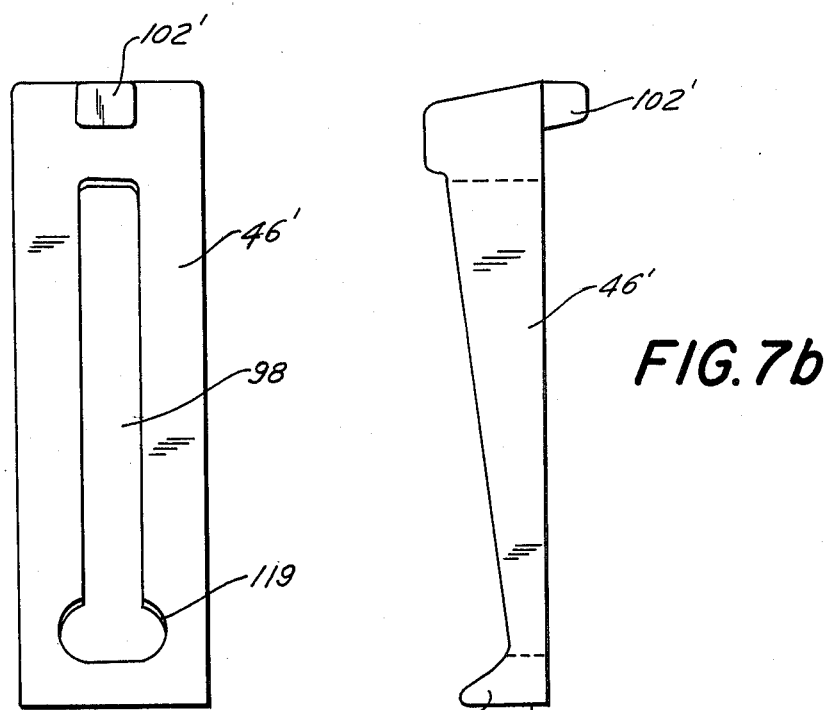
FIG. 7a
FIG. 7b
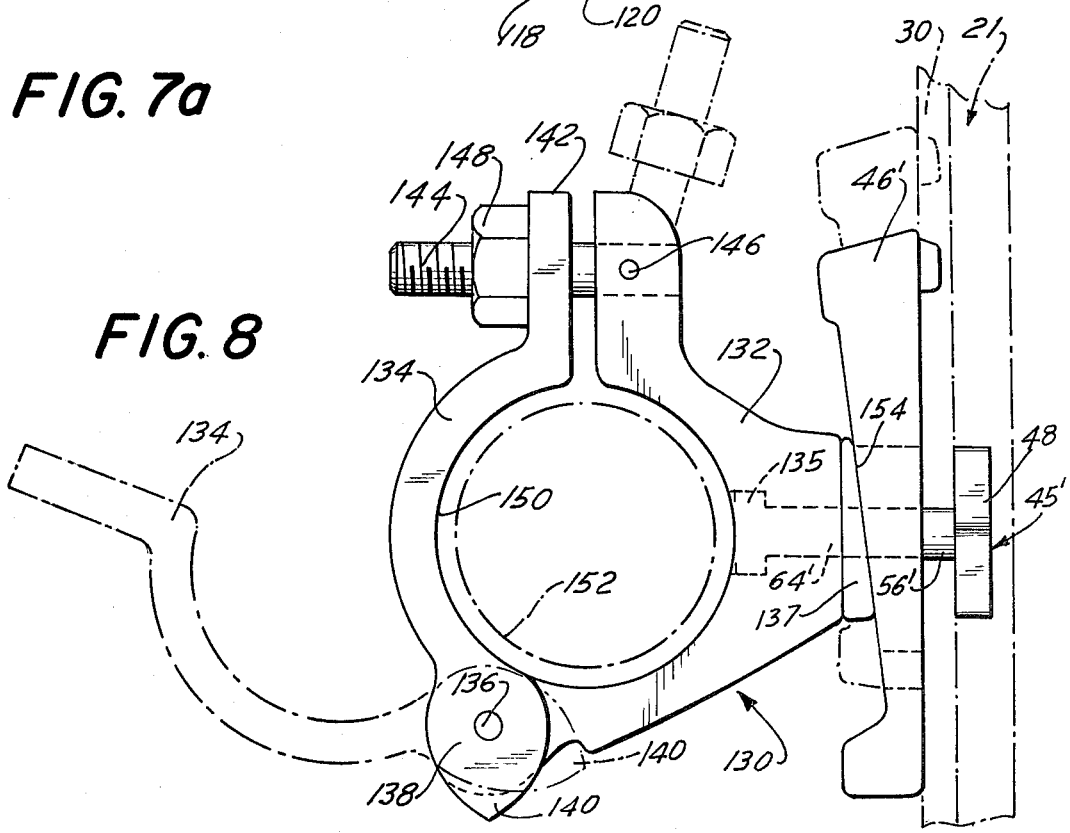
FIG. 8

CONNECTOR ASSEMBLY

The present invention relates to a connector assembly, particularly for adjustably fixing a stud to a slotted structure, and, more particularly, to a connector arrangement for adjustably securing a brace in a shoring or scaffolding system to a vertical support element.

BACKGROUND OF THE INVENTION

In conventional shoring and scaffolding arrangements, the vertical support elements are reinforced and stabilized by the use of cross braces extending between them. Typically, these braces are secured to the vertical supports by bolt and nut assemblies with the bolts or studs, typically being welded or otherwise rigidly secured in fixed positions to the vertical support. With such arrangements, there has been at best difficult and limited flexibility in the positioning of the connection between the brace and the support.

It is an object of the present invention to provide a connector assembly which will fasten a stud to a thin-walled slot, in general, and in particular permit a rapid and firm connection between a cross brace and a vertical support element in a shoring or scaffolding system.

Another object of the present invention is to provide an adjustable connector assembly for a shoring and scaffolding system.

A further object of the present invention is to provide a connector assembly which will permit two components to be adjustably connected to each other in a rapid and secure manner, preferably without the need for tools (or, at the most, with no more than a hammer or the like).

Yet another object of the present invention is to provide a relatively inexpensive adjustable connector assembly.

BRIEF DESCRIPTION OF THE INVENTION

In accordance with a preferred embodiment of the present invention, a wedge-lock T-bolt connector assembly for use in a shoring structure having vertical support stanchions with longitudinal T-slots provides a quick and releasable connection between a reinforcing or cross brace and the stanchion. The connector assembly is primarily intended for use with vertical shoring frame legs having open channels (often referred to as T-slots), which latter include a pair of spaced shoulders defining a slot therebetween. The connector assembly itself includes a T-bolt comprising a stud having an enlarged T-shaped head adapted to be received in a stanchion channel and a depending shank adapted to extend away from the head through the slot of the channel. The stud shank has a bearing surface formed thereon spaced from and facing the stud head, preferably with a cross section over at least one portion of its length between the bearing surface and head which includes two parallel straight edges. A tapered locking wedge, advantageously having an elongated slot formed therein, is also provided. The wedge is mounted on the stud to slidably receive the stud shank in its slot between the head and bearing surface.

The slot in the wedge advantageously has spaced parallel sides cooperating with the aforementioned parallel sides of the stud shank to prevent relative rotation between the stud and the wedge. The T-shaped head of the stud is set at an angle to the parallel sides of the stud shank such that when said sides are aligned with the stanchion channel, the T-head is turned to a locking position to catch behind the channel shoulders. Thus, by inserting the bolt-head in the channel and turning the wedge to a vertical position, the T-bolt is locked into the channel. As the wedge has a width dimension which varies in the length dimension of the stud from a wider to a narrower end, the wedge will cooperate with the bearing surface and the vertical stanchion as the wider portion of the wedge is moved between the bearing surface and the stud head to urge the head into a gripping relationship against the shoulders of the channel and thereby firmly secure the stud to the stanchion.

Preferably, the wedge has a nub in line with its slot depending from the underside of said wedge. This nub fits into the channel slot and prevents rotation of the wedge and its cooperatively secured T-bolt.

In one embodiment of the invention, the stud shank has an extension projecting outwardly beyond the bearing surface thereof and including, at its end, a pivoted toggle (of the type typical for use with shoring bracing). This extension is adapted to be inserted in an end aperture of a cross brace when the toggle is pivoted to align with the stud shank. After the brace is mounted on the shank, the toggle is pivoted by gravity to position perpendicular to the axis of the shank, thereby locking the brace on the stud and securing the brace to the vertical stanchion.

BRIEF DESCRIPTION OF THE DRAWINGS

In this specification and the accompanying drawings, I have shown and described a preferred embodiment of my invention and have suggested various alternatives and modifications thereof, but it is to be understood that these are not intended to be exhaustive and that many other changes and modifications can be made within the scope of the invention. These suggestions herein are selected and included only for purposes of illustration in order that others skilled in the art will more fully understand the invention and the principles thereof and will thus be enabled to modify it and embody it in a variety of forms, each as may be best suited to the conditions of a particular use.

FIG. 1 is a perspective view of a shoring system in which connector assemblies of the present invention are adapted to be utilized;

FIG. 2 is an enlarged isometric view of a connector assembly constructed according to one preferred embodiment of the present invention (shown securing a cross-brace to the portion of a vertical stanchion having a T-slot therein);

FIG. 3 is an exploded isometric view of the connector assembly shown in FIG. 2;

FIG. 4 is a sectional view taken as though along line 4—4 of FIG. 1 but with two different connector assembly embodiments according to the invention shown mounted in the channels of a vertical stanchion;

FIG. 7a is a rear view of a locking wedge constructed according to another embodiment of the present invention;

FIG. 7b is a side view of the wedge shown in FIG. 7a;

FIG. 8 is a side view of a connector assembly constructed according to another embodiment of the present invention adapted to provide mounting support for a tubular brace element;

FIG. 12 is an isometric view of a modified T-bolt illustrating an alternative embodiment of the present invention.

FIG. 12a is an enlarged view cross-section of a still further embodiment similar to the bolt shown in FIG. 12.

Figure 5:
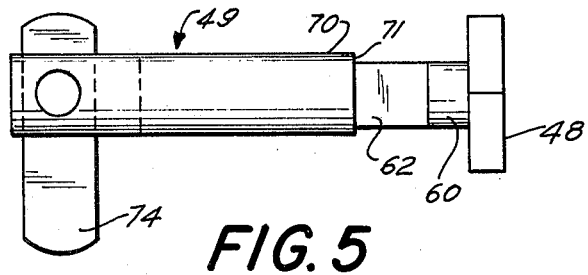
FIG. 5 is a side view of a connector stud constructed for the assembly of the present invention according to another embodiment.

Referring now to the drawings in detail, and initially to FIG. 1 thereof, a scaffolding system 10, in which the connector assemblies of the present invention may be utilized is illustrated. The illustrated scaffolding assembly includes a pair of cross braced frames 20 topped by a pair of cross braced extension frames 50. Levelling jack screws 42 in the bottommost frame legs 21, 22 and height adjustment jack screws 65 in the top of the extension frame legs 51, 52 are provided as needed.

The specific construction of the frames illustrated in FIG. 1 is described in detail in copending U.S. Pat. application Ser. No. 185,761 filed Sept. 10, 1980, the disclosure of which is incorporated herein by reference. Briefly, however, it is noted that each base frame 20 comprises spaced parallel legs 21 and 22, with each leg being an extruded hollow aluminum tube of oval cross-section having a major and minor axes. As seen in FIG. 4, diametrically opposed T-slots comprising channels 25 and 26 are formed at the opposite ends of the major axis of the legs, and at least one similar channel 27 is formed 90° therefrom. These channels include bases 28 and a pair of flanges 30, which define a slot 32 therebetween. The flanges 30 provide interior shoulders 34 which cooperate with the connector assembly of the present invention to firmly secure cross braces to legs 21, 22.

Base frames 20 are braced by side cross braces 80, 81 which are pivotally connected at 82. The free ends of these braces 80, 81 are connected to the adjacent legs 21, 22 by fixed connectors 39, or optionally by connector assemblies 40 of the present invention. More typically, these connector assemblies provide a quick and firm attachment between the braces 83, 84 and the vertical legs or stanchions 51, 52 of the extension frames 50 to provide the necessary reinforcement and support. In addition, they permit infinite adjustment of movement of the ends of the braces 83, 84 along the vertical height of the base frame legs 21, 22, so that the height of the extension frames 50 can be adjusted relative to the base frames 20, as desired.

Referring more specifically to FIGS. 2 and 3, connector assembly 40 includes a stud 45 and a locking wedge 46. Stud 45 includes a T-shaped head 48 and a shank 49. Head 48 is rhomboid in shape, having pairs of parallel sides 53, 54. Sides 54 are spaced from each other by a distance d which is slightly less than the width of slot 32 of the channel. This permits the head 48 of the bolt 45 to be inserted into the channel 25 at any position along the length thereof. Alternatively, head 48 may have conventional polygonal or circular configuration, but then it must be inserted in the channels from the ends of the legs 21, 22.

Sides 53 of head 48 are parallel to each other and spaced apart by a distance e (equal to the width of a channel 25). In the locked position, sides 53 are parallel to the side walls 55 of the stanchion channels. After the head 48 is inserted in the channel 25 (with sides 54 thereof parallel to the sides of the slot 32), the stud 45 is rotated slightly so that head surfaces 53 engage the sides 55 of the channel 25. This rotation captures the head 48 behind the shoulders 34 of the channel 32 to secure the bolt 45 in the channel 25.

In most of the illustrated embodiments of the invention, stud shank 49 is formed of two parts. It includes stud section 56, integrally formed with head 48, and a connector section 58 threadedly engaged therewith. The stud section 56 includes a first portion 60 having a generally circular cross-section, a second portion 62 having a square cross-section and a threaded end portion 64. Two parallel sides of section 62 are parallel to the sides 53 of head 48.

The connector unit 58 is a generally cylindrical element having an internal threaded portion 66 and a free end 68. Threaded portion 64 of stud section 56 is threaded into the section 66. As the diameter of connector unit 58 is larger than that of stud shank section 56, end 70 thereof provides a bearing surface or shoulder 71 facing head 48, as seen in FIG. 5. This bearing surface 71 may be enlarged by the provision of an integral flange 110 as seen in FIG. 3. Alternatively, this flange may be provided as a separate washer welded or adhered to unit 58 in any convenient manner.

Free end 68 of connector unit 58 has a slot 72 formed therein in which a toggle link 74 is pivotally mounted by a rivet 76 or the like. The faces of link 74 are parallel to sides 53 when the stud section 56 and connector section 58 are joined.

The other element of the connector assembly, wedge 46, preferably would be a 1-piece malleable iron casting. The wedge has upper and lower ends 90, 92, respectively, with the upper end being wider than the lower end. Rear face 94 of the wedge is straight, to lie essentially parallel to the outer faces of the channels on the stanchions, and front face 96 thereof is inclined relative to the rear face, thereby to provide the tapering width in the length dimension of stud 49. The angle between the front and rear faces 94, 96 of the wedge 46 is preferably 7°, and advantageously would range from about 5° to 15°. At about 5° the wedging becomes too tight to be conveniently removable, and above about 15° the wedge locking may not be secure.

Wedge 46 includes an elongated closed ended slot 98. The slot is generally rectangular and has straight parallel sides 100. Although, the sides 100 may slightly converge at the smaller end 92 to lightly grip the square shank portion 56 of stud 45, to aid in mounting the assembly 40 in the slot 25. This would permit the connector assembly initially to be handled effectively as a single piece, rather than as two loosely joined pieces.

The wedge 46 is assembled to stud 45 before connector unit 58 is engaged with stud shank section 56. That is, stud shank section 56 is inserted in slot 98 before connector unit 58 is threadably engaged with end 64. The stud 45 will be held loosely on the wedge 46, because the width d of the head 48 of stud 45 is wider than the width of the wedge slot 98. This is an advantage on construction sites in preventing loss of loose parts.

The rear surface of wedge 46 has a nub 102 formed thereon whose width is slightly smaller than the width of the slots 32 in the stanchion channels. The width of the wedge, including the nub at the narrower end thereof, is slightly less than the length of the square section 62 of the stud. With this arrangement, the assembled wedge and stud can be positioned with the stud in the lower end of slot 98 so that head 48 of the stud can be inserted into a channel in the stanchion and rotated, with circular section 60 of the stud being accomodated between the flanges or shoulders 30 of the channel. Once the head 48 of the bolt 45 is seated with sides 53 thereof against the sides 55 of the channel 25, the wedge will be vertically aligned with channel slot 32 and can then be moved downwardly relative to the stud, so that nub 102 enters slot 32. Continued downward movement of the wedge 46, will cause the tapered outer surface 96 thereof to bear against shoulder 71 and urge the stud outwardly. This causes the inner surface of head 48 to engage against shoulders 34 of the channel 25, to tightly wedge the stud 45 in place. Tapping the upper end of the wedge with a hammer will assure a firm tight connection.

The placement of the nub 102 in the slot 32 of the channel 25 will serve to lock the stud 45 against any possible rotation, as a result of the cooperation of the flat sides of square section 62 of the stud with the sides of the slot 32. This is a positive safety feature ensuring that the T-bolt head 48 cannot rotate and drop out of the channel 25. This also assures proper functioning of the toggle 74. If the safety feature were not necessary to a particular use for the connector 40, then the square section 62 could be alternatively rounded (but this would lose the positive orientation of the head 48 in channel 25).

Figure 6:
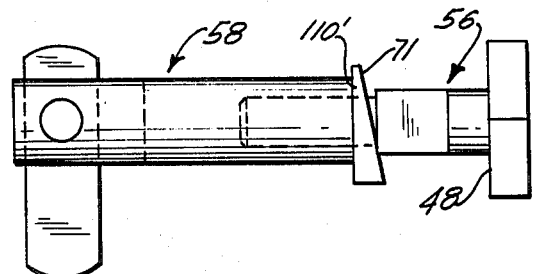
FIG. 6 is a side view similar to FIG. 5 of yet another embodiment of the stud construction.

In another embodiment illustrated in FIG. 6 of the drawings, bearing surface 71 of collar 110' is tapered slightly to be generally complementary to the taper of the wedge. Similarly, in any of the illustrated embodiments, the upper face 96 of the wedge 46 may be transversely inclined downward and away from the slot 98 (i.e. non-planar) or roughened or otherwise modified to insure a better grip of the wedge 46 against the bolt surface 71.

To further resist possible vertical sliding movement of the stud in the channel prior to (and also in place of or in addition to) the positive locking provided by application of the wedge, head 48 may be provided with a rear protuberance 114, as illustrated in the bottom portion of FIG. 4. This rear protuberance is dimensioned to be engaged in apertures 116 formed in the base 28 of the channels. This arrangement provides a more positive locking against vertical movement of the stud, but limits the degree of vertical adjustability of the stud in the channel. Also, the stud must be removed from the channel to move it from one vertical position to another.

Another embodiment of the locking wedge 46' of the invention is illustrated in FIGS. 7a and 7b. In this embodiment, the nub 102' is positioned adjacent the wider end 90' of the wedge. In this position, the nub serves the same purpose as in the prior embodiment but permits some additional degree of freedom of movement of the wedge during the assembly operation.

In addition, in this embodiment of the invention the lower end of the wedge is enlarged, to form a striking foot 118. This striking foot provides a surface 120 which can be struck with a hammer or the like, to disengage the wedge from the bearing surface 71 of the stud 45 when it is desired to move the stud 45.

Although the stud of the invention is generally illustrated as being formed in two parts, which permits insertion of shank section 56 in wedge slot 98, it is contemplated that the stud can be formed of a one piece element by casting, using powder metallurgy techniques, or by cold extrusion (see FIG. 5). In such cases the slot 98 of the wedge is provided with an enlarged keyhole type opening 119 at the lower end of the slot to permit the stud to be inserted in the slot and the wedge positioned between the stud's head and bearing surface. This keyhole 119 may be closed after assembly.

Another embodiment of the invention is illustrated in FIG. 8. In this embodiment of the invention, in lieu of stud extension 58, a clamp element 130 is secured on the end of integral stud shank section 56'. This clamp arrangement includes a fixed clamp element 132 joined to stud section 64' and a movable clamp element 134. The latter is pivotally connected by a pin 136 or the like in any convenient manner to clamp element 132. Fixed clamp element 132 may be joined to stud 45' by a fastening means 135 (either a locking nut or a formed-over head). A washer 137 (preferably wedge shaped) permits rotation of the clamp 130 about stud 45' to accomodate angled bracing 152 (adjustable in a vertical plane).

Preferably, the lower end of clamp element 134 fits within a yoke or pair of flanges 138 formed on element 132 and has an extension 140 which acts as a stop, as shown in dotted lines in the drawing, to limit the degree of pivotal movement of clamp element 134 with respect to clamp element 132. The upper end 142 of clamp element 134 is split to provide a slot which receives the end of bolt 144. The latter is pivotally mounted at 146 in clamp element 132 and has a nut 148 thereon.

This clamp arrangement permits the positive securement of a tubular brace element 152 to the vertical stanchion 21. As seen in the drawing, clamp elements 132 and 134 have curved surfaces 150 generally complementary to the tubular member 152, shown in dotted lines, to be secured therein. When the tube is placed in clamp element 132, clamp element 134 is pivoted to the closed position, and latching bolt 144 is pivoted down into the solid line position shown in FIG. 8. Nut 148 is then tightened to cause clamp element 134 to pivot towards clamp element 132 and thus firmly secure tube 152 therein. The stud 45' may be mounted on the stanchion 21 in the same manner as for the previously described embodiments (or in the alternative manner shown in FIG. 8), and wedge 46' operates, as described above, to firmly secure the clamp 130 to the stanchion. In this illustrated embodiment, rear surface 154 of washer 137 is tapered to be complementary to the outer face of the wedge 46', and thereby provide a tight positive engagement therebetween firmly holding the clamp element 130 on the stanchion 21, with the brace 152 shown fixed horizontally.

Figure 9:
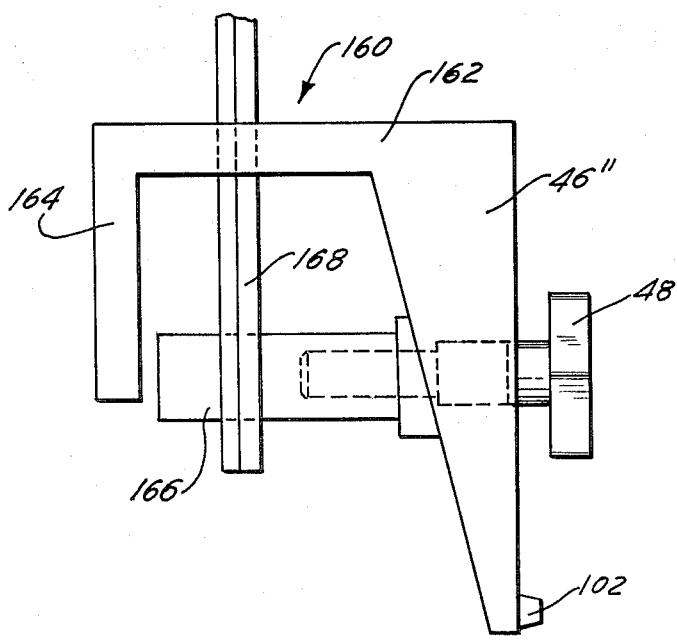
FIG. 9 is a partially diagrammatic side view of a slide-locking embodiment of the invention.

In the embodiment of the invention as illustrated in FIG. 9, in lieu of the toggle element on the end of the connector unit, wedge 46 is provided with an L-shaped slide-lock extension 160 having a first leg 162 extending generally parallel to the stud and a second leg 164 extending perpendicularly thereto. L-shaped extension 160 travels with the wedge. Legs 162, 164 are dimensioned such that when the stud is at the bottom of the slot 98 in the wedge, the free end of the stud is exposed so that the end 168 of a brace may be positioned on the stud. When the wedge is moved downwardly into locking position leg 164 is moved into position adjacent the free end 166 of the stud. This slide-lock blocks inadvertent removal of the end of the brace from the stud.

Figure 10:
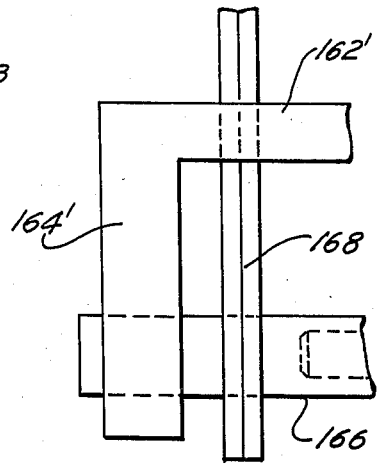
FIG. 10 is a diagrammatic side view similar to FIG. 9 of an alternative fork-shaped slide-locking embodiment.

A similar embodiment of the invention is illustrated in FIG. 10, wherein the leg 164' of the wedge-extension is forked to fit closely on either side of the stud 166, near its free end. Alternatively, the connector unit 58 may have a slotted end, similar to the slotted end in the stud shown in FIG. 2, but without the pivoted toggle. In this case, leg 162" (not illustrated) of the L-shaped wedge extension is dimensioned to permit leg 164" to enter the slot in the stud when the wedge is fully engaged. This also serves to block removal of end 168 of the brace from the stud.

Figure 11:
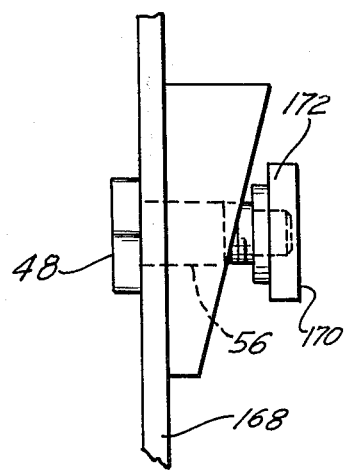
FIG. 11 is a side view of an embodiment of the invention wherein the connector assembly is at least semi-permanently mounted on the end of a support brace.

FIG. 11 illustrates a further embodiment of the invention wherein the connector assembly is secured to end 168 of a brace for permanent retention thereon. As seen therein, the stud includes an integral stud shank section 56, and an end cap or nut 170 which is threadedly engaged thereon. In assembling the embodiment of FIG. 11, end 168 of the brace is placed over the stud adjacent the head 48 and then the wedge is placed over the stud, in the relationship shown. Thereinafter, end cap 170, which includes an integral flange 172, is threaded on stud section 56. By this arrangement, the wedge and the brace will remain engaged with the stud, even when the stud is disengaged from the vertical stanchion. This eliminates problems of storage of the connector assembly and loss of the various components. In use, the end of the brace is positioned adjacent the stanchion (not shown in FIG. 11) and the head 48 of the stud 56 is engaged in the stanchion slot as described above. Thereinafter, the wedge 46 is moved downwardly, so that its inclined surface engages against the bearing surface provided by cap 170, thereby to wedge and lock the stud in a fixed position.

In the modified T-bolt embodiment illustrated in FIG. 12, the placement of the square portion 62a and the circular cylindrical portion 60a along shank 56a have been reversed. This modified stud 45a is adapted for use in a slot 32a where there is no channel 25 (or the channel is very deep relative to the thickness of the head 48a). This means that the T-head 48a can be inserted into the slot deeply enough for the square portion 62a to clear the slot 32a; the bolt 45a is then twisted to the right angle position (with the head across the slot 32a); and then the wedge 46a (not shown) is driven tight drawing the square portion 60a up between the parallel lips or shoulders forming the slot 32a until the head 48a seats against the underside of the structure 180. Since the width of the square portion 60a is only slightly less than the width of the slot 32a; therefore the stud 45a cannot rotate to fall out of the slot 32a until the wedge 46a is loosened. The head 48a can be circular if slot 32a is open-ended. Portion 60a need not be square, so long as it is sized and shaped to lock bolt 45a from rotating by fitting snugly in slot 32a with at least one flat surface preventing rotation. The structure 180 is preferably relatively thin-walled or equivalent (at least sufficient to provide lips of adequate size and thickness to permit stud 45a to function). Note that free end 68a is partially threaded rather than being a toggle (as in FIG. 3).

FIG. 12a shows a modification of the bolt in FIG. 12, which is particularly useful in situations where there is little depth clearance for the head 48b and no close-in channel walls 55 to serve as an orienting stop. In this embodiment, the stop portion 60b is not square in cross-section; but instead is rectangular with two opposite corners both radiused to permit the bolt 45b to be rotated 90° in a slot through which the head 48b closely fits and to be stopped at that right angle position by the ears 182 of portion 60b butting against the shoulders which form said slot.

What is claimed is:

1. A connector assembly for use with a support element having an outwardly opening channel formed therein by a pair of spaced shoulders defining a slot, said assembly comprising a stud having a T-shaped head dimensioned to be received in said channel and a shank connected to said head to extend through said slot away from said head, said shank having a bearing surface thereon parallel to, spaced from and facing said head, and a tapered wedge having front and back surfaces and an aperture extending from said front surface to said back surface, the shank passing through said aperture so that the tapered wedge is slidably mounted on said shank between said head and said bearing surface for engaging said channel with its back surface and said bearing surface with its front surface to urge said head against an inner surface of the shoulders of the channel, thereby to firmly secure the stud to the support element, said shank having mounting means projecting from said bearing surface to be received in an apertured member for supporting the same.

2. A connector assembly for use with a support element having an outwardly opening channel formed therein by a pair of spaced shoulders defining a slot, said assembly comprising a stud having a head dimensioned wider than said channel to be received in said channel behind said shoulder and a shank connected to said head and dimensioned narrower than said channel to extend through said slot away from said head, said shank having a bearing surface thereon spaced from and facing said head, a tapered wedge having an aperture disposed over said shank between said head and said bearing surface slidably mounting said wedge on said shank, said wedge having one surface engaging said bearing surface and another surface bearing against an outer side of said shoulders to urge said head against an under side of the shoulders of the channel thereby to firmly secure the stud to the support element, and said stud having an extension portion projecting outwardly beyond said bearing surface to a free end and being adapted to be received in an apertured end of a brace for the support element and retaining means cooperating with said apertured end for securing said brace on said extension.

3. A connector assembly as defined in claim 2 wherein said retaining means comprises a toggle pivotally mounted on said extension portion for retaining said brace on said extension portion.

4. A connector assembly for use with a support element having an outwardly opening channel formed therein by a pair of spaced shoulders defining a slot, said assembly comprising a stud having a head dimensioned wider than said slot to be received in said channel behind said shoulders, a shank connected to said head and dimensioned narrower than said slot to extend through said slot away from said head, said shank having a bearing surface thereon spaced from and facing said head, a tapered wedge having front and back surfaces and an aperture extending between said front and back surfaces, the shank passing through said aperture so that said wedge is slidably mounted on said shank for engaging said bearing surface with said front surface while engaging an outer surface of said shoulders with said back surface to firmly secure an under side of the stud to the support element, and said stud head being T-shaped and having a width dimension wider than the width of the slot and a breadth dimension narrower than the width of the slot, such that the stud head is insertable in said slot anywhere along the length of the channel, and can be twisted for retention behind said shoulders, said shank having mounting means projecting outwardly beyond said bearing surface to be received in an apertured member for supporting the same.

5. A connector assembly for use with a support element having an outwardly opening channel formed therein by a pair of spaced shoulders defining a slot, said assembly comprising a stud having a head dimensioned wider than said slot to be received in said channel and a shank connected to said head and dimensioned narrower than said slot to extend through said slot away from said head, said shank having a bearing surface thereon spaced from and facing said head, a tapered wedge having front and back surfaces and an aperture extending between said front and back surfaces, with said shank passing through said aperture so that the wedge is slidably mounted on said shank for engaging an outer side of said shoulders with said back surface and said bearing surface with said front surface to urge said head against an under side of the shoulders of the channel thereby to firmly secure the stud to the support element, and said wedge having a nub extension formed on the side thereof facing said support element and being dimensioned to be received in said slot to align said wedge with said slot, said shank having mounting means projecting outwardly beyond said bearing surface to be received in an apertured member for supporting the same.

6. A connector assembly as defined in claim 5 wherein said wedge has a varying width dimension between its front and back surfaces such that said wedge has opposite wide and narrow ends, said nub being located at said narrow end.

7. A connector assembly as defined in claim 5 wherein said wedge has a varying width dimension between its front and back surfaces such that said wedge has opposite wide and narrow ends, said nub being located at said wide end.

8. A connector assembly as defined in any one of claims 1 to 4 wherein said wedge has a varying width dimension between its front and back surfaces such that the wedge has opposite wide and narrow ends, with said narrow end having an enlarged foot formed thereon providing a striking surface.

9. A connector assembly for use with a support element having an outwardly opening channel formed therein by a pair of spaced shoulders defining a slot, said assembly comprising a stud having a head dimensioned wider than said slot to be received in said channel and a shank connected to said head and dimensioned narrower than said slot to extend through said slot away from said head, said shank having a bearing surface thereon spaced from and facing said head, a tapered wedge having front and back surfaces and an elongated slot extending from said front surface to said back surface and mounted over said shank so that said wedge is slidably mounted on said shank for engaging said bearing surface with its front surface and an outer side of said shoulders with its back surface to urge said head against the shoulders of the channel thereby to firmly secure the stud to the support element, said stud having at least one section of predetermined length having a cross section including a pair of parallel sides spaced apart one predetermined distance and said elongated slot of the wedge including parallel sides spaced a distance corresponding to said one distance for receiving said at least one section of the stud thereby to hold the stud against rotation relative to the wedge, with the distance between the parallel sides of the stud section being not substantially less than the distance between the parallel sides of the wedge slot, said shank having mounting means projecting outwardly beyond said bearing surface to be received in an apertured member for supporting the same.

10. A connector assembly as defined in claim 5 wherein said wedge has an elongated slot formed therein receiving said stud, said slot having opposed closed ends, one of which includes an enlarged opening for permitting passage of said flange therethrough.

11. A connector assembly as defined in claim 10 wherein said one side of the flange is inclined to be generally complementary to the taper of the wedge.

12. A connector assembly as defined claim 2 wherein said wedge has opposed ends, one end being wider than the other in the length dimension of the stud, said wider end having an L-shaped projection extending therefrom including one leg parallel to the stud and another leg perpendicular to the stud, said one leg being dimensioned to present said other leg closely adjacent the free end of the stud when the wedge is in bearing engagement with said bearing surface, such that a brace positioned on said stud is captured thereon.

13. A connector assembly as defined in claim 12 wherein said other leg is forked and positioned to fit over said stud at its free end.

14. A connector assembly as defined in claim 12 wherein said free end of the stud is slotted and said other leg is adapted to be received therein.

15. A connector assembly for use with a support element having an outwardly opening channel formed therein, said channel having a pair of spaced shoulders defining a slot, said assembly comprising a stud having a head of one dimension wider than said slot to be received in said channel and a shank dimensioned narrower than said slot adapted to extend through said slot away from said head, said shank having a bearing surface thereon spaced from and facing said head, a tapered wedge having front and back surfaces and an aperture extending from said front to said back surface, with said shank passing therethrough so that said wedge is slidably mounted on said shank for engaging said bearing surface with its front surface and an outer side of said shoulders with its back surface to urge said head against an under side of the shoulders of the channel to firmly secure the stud to the support element, with said stud at its end opposite its head, including a fixed clamp portion of a tube mounting clamp with a pivoted clamp portion pivotally secured at one end to the fixed clamp portion; and cooperating means on said clamp portion for releasably securing the opposite end of the pivoted clamp portion to the fixed clamp portion.

16. A connector assembly in combination with a shoring and/or scaffolding structure having stanchions which include outwardly opening channels having pairs of spaced shoulders providing a slot therebetween, said assembly comprising a stud having an enlarged head dimensioned wider than said slot to be received in one said channel in said stanchion and a shank of narrower dimension than said slot and connected to said head and extending away from said head through said slot; said shank having a bearing surface formed thereon spaced from and facing said head and a cross-section over at least one portion of its length between said bearing surface and head which includes two parallel straight sides spaced one predetermined distance; and a tapered locking wedge; said wedge having an elongated slot formed therein slidably receiving said shank between said head and said bearing surface; the slot in said wedge having spaced parallel sides, not substantially farther apart than the one predetermined distance separating the parallel sides of said at least one shank portion, cooperating with the sides of said shank portion to prevent relative rotation between the stud and the wedge; said wedge having a width dimension considered in the length direction of the stud which dimension varies along the wedge from a wider to a narrower end, such that said wedge will cooperate with said bearing surface to urge said head against the shoulders of the channel to firmly secure the stud to the stanchion, and said shank including mounting means projecting distally from said bearing surface to mount a supported member.

17. A connector assembly as defined in claim 16 wherein said head is T-shaped and has a width dimension slightly smaller than that of said slot whereby it is adapted to be inserted in said slot anywhere along the length thereof.

18. A connector assembly as defined in any one of claims 16 or 17 wherein said shank has at least one other section between said one section and said head which other section is generally circular in cross-section; said other section having a length which is slightly greater than the width of the wedge adjacent the narrower end thereof whereby said one section is within said slot when the stud head is operatively positioned in said channel.

19. A connector assembly as defined in claim 18 wherein said shank has a threaded free end portion; and said mounting means includes a stud end unit having a larger diameter than the greatest cross-section dimension of said one section and a female threaded end portion threadedly engaged with said free end, thereby to provide a stepped surface on the shank of said stud defining said bearing surface.

20. A connector assembly as defined in claim 17 wherein said stud has an annular flange of greater diameter than said other section and defining said bearing surface.

21. A connector assembly as defined in claim 17 wherein said wedge has a first face adapted to be generally parallel to the plane of the head of said stud and a second face inclined at an angle relative to said plane and facing said bearing surface thereby to define said varying width in the wedge; and wherein said angle is in the range of from 5° to 15°.

22. A connector assembly as defined in claim 19 wherein said stud end unit projects outwardly beyond said bearing surface to a free end and is adapted to be received in the apertured end of a brace for said stanchion.

23. A connector assembly as defined in claim 20 wherein said free end of said stud end unit has a toggle pivotally mounted thereon for retaining said brace on said stud end unit.

24. A connector assembly as defined in claim 17 wherein said wedge has a nub extension formed on the side thereof facing said legs and adapted to be received in said slot.

25. A connector assembly as defined in claim 24 wherein said nub is located at the narrower end of said wedge.

26. A connector assembly as defined in claim 24 wherein said nub is located at the wider end of said wedge.

27. A connector assembly as defined in claim 17 wherein said wedge has an enlarged opening therein adjacent the end of the slot at the narrow end of the wedge to permit insertion of said stud and bearing surface into said slot to engage said one section of the stud with the sides of the slot.

28. A connector assembly as defined in claim 17 wherein said narrower end of the wedge includes an enlarged striking foot.

29. A connector assembly as defined in claim 17 wherein the wider end of the wedge has a generally L-shaped projection extending therefrom including one leg extending parallel to the stud and another leg extending perpendicularly to the stud; said one leg being dimensioned to present said another leg adjacent to the end of the stud where the wedge is in bearing engagement with said bearing surface.

30. A connector assembly as defined in claim 17 wherein said free end of the stud is slotted and said other leg of the wedge is dimensioned to be received therein.

31. A connector assembly as defined in claim 19 wherein said stud end unit comprises a releasable clamp means for securing a brace to the stud.

32. A connector assembly as defined in claim 31 wherein said releasable clamp means includes a first clamp element threadedly engaged with said bolt, a second clamp element pivotally connected to the first clamp element, and cooperating means on said clamp element for releasably securing the clamp elements together.

33. A connector assembly as defined in claim 32 wherein said clamp elements have curved surfaces formed therein for engaging and clamping tubular braces.

34. A connector assembly as defined in claim 1 wherein said wedge has an elongated slot formed therein receiving said stud, said slot having opposed closed ends, one of which includes an enlarged opening for permitting passage of said flange therethrough.

35. A connector assembly for fastening a structural member to a structure having an elongated slot therein including a pair of relatively thin-walled spaced shoulders defining said slot, said assembly comprising a stud having a T-shaped head broader in a length dimension thereof than said slot and narrower in a width dimension thereof and being adapted to be received behind said slot and having a shank adapted to extend through said slot away from said head, said shank having a bearing surface thereon spaced from and facing said head, and a tapered wedge having an aperture therein through which said shank passes such that the wedge is slidably mounted on said shank between said shoulders and said bearing surface for engaging said bearing surface to urge said head against an outer side of the shoulders of the channel to firmly secure the stud to said shoulders, said shank having mounting means projecting outwardly beyond said bearing surface to be received in an apertured member for supporting the same.

36. A connector assembly as defined in claim 35 wherein said locking portion is square in cross-section and shaped to engage at least of said shoulders when said head is wedged thereto to prevent rotation of the stud.

37. A connector assembly as defined in claim 35 wherein said stud head is T-shaped and has a width dimension narrower than the width of the slot whereby it is adapted to be inserted in.

38. A connector assembly as defined in claim 2 wherein said stud head is T-shaped and has a width dimension narrower than the width of the slot whereby it is adapted to be inserted in said slot anywhere along the length of the channel.

39. A connector assembly as defined in claim 3 wherein said stud head is T-shaped and has a width dimension narrower than the width of the slot whereby it is adapted to be inserted in said slot anywhere along the length of the channel.

40. A connector assembly as defined in any one of claims 2 to 4, 38, or 39, wherein said wedge has a nub extension formed on the side thereof facing said support element and dimensioned to be received in said slot.

41. A connector assembly as defined in claim 40 wherein said wedge has a varying width dimension in the longitudinal direction of the stud defining opposite wide and narrow ends, said nub being located at said narrow end.

42. A connector assembly as defined in claim 40 wherein said wedge has a varying width dimension in the longitudinal direction of the stud defining opposite wide and narrow ends, said nub being located at said wide end.

43. A connector assembly as defined in any one of claims 2 to 4, 38, or 39, wherein said stud has at least one section of predetermined length having a cross-section including a pair of parallel sides and said wedge has an elongated slot including parallel sides for receiving said at least one section of the stud thereby to hold the stud against rotation relative to the wedge.

44. A connector assembly as defined in claim 40, wherein said stud has at least one section of predetermined length having a cross-section including a pair of parallel sides and said wedge has an elongated slot including parallel sides for receiving said at least one section of the stud thereby to hold the stud against rotation relative to the wedge.

45. A connector assembly as defined in any one of claims 2, 4, 5, 38, and 39, including an annular flange secured axially to said stud having one side facing the front side of said wedge and defining said bearing surface.

* * * * *

UNITED STATES PATENT AND TRADEMARK OFFICE
CERTIFICATE OF CORRECTION

PATENT NO. : 4,430,019
DATED : February 7, 1984
INVENTOR(S) : Michael S. D'Alessio It is certified that error appears in the above-identified patent and that said Letters Patent are hereby corrected as shown below:

Column 13, line 4, after "in" insert --said slot anywhere along its length and said shank has a stop portion immediately adjacent said head which is dimensioned to fit between said shoulders of said slot and permit 90° of rotation, but having ears which stop further rotation--  (claim 37, line 4)

Signed and Sealed this

Eleventh Day of September 1984

[SEAL]

Attest:

Attesting Officer

GERALD J. MOSSINGHOFF

Commissioner of Patents and Trademarks